United States Patent [19]

Yasuhara

[11] Patent Number: 4,502,438

[45] Date of Patent: Mar. 5, 1985

[54] ELECTRONIC FUEL INJECTION CONTROL METHOD AND APPARATUS FOR A FUEL INJECTION TYPE INTERNAL COMBUSTION ENGINE

[75] Inventor: Seishi Yasuhara, Yokosuka, Japan

[73] Assignee: Nissan Motor Company, Limited, Japan

[21] Appl. No.: 363,152

[22] Filed: Mar. 29, 1982

[30] Foreign Application Priority Data

Mar. 30, 1981 [JP] Japan ............................ 56-45649

[51] Int. Cl.$^3$ .............................................. F02D 5/02
[52] U.S. Cl. .................................... 123/357; 123/494; 73/119 A
[58] Field of Search ............... 123/357, 494, 478, 480, 123/487, 488; 73/119 A

[56] References Cited

U.S. PATENT DOCUMENTS

| | | | |
|---|---|---|---|
| 3,575,145 | 4/1971 | Steiger | 123/357 |
| 3,630,643 | 12/1971 | Eheim et al. | 417/282 |
| 4,131,014 | 12/1978 | Scott | 73/119 A |
| 4,372,266 | 2/1983 | Hiyama et al. | 123/357 |
| 4,426,981 | 1/1984 | Greiner et al. | 123/494 |

FOREIGN PATENT DOCUMENTS

| | | | |
|---|---|---|---|
| 2805175 | 8/1979 | Fed. Rep. of Germany | 123/494 |
| 3122553 | 3/1982 | Fed. Rep. of Germany | 123/357 |

*Primary Examiner*—Andrew M. Dolinar
*Attorney, Agent, or Firm*—Lowe, King, Price & Becker

[57] ABSTRACT

An electronic fuel injection control method and apparatus employs sensors which sense engine speed and the opening interval of a fuel injection valve to provide a measure of the actual fuel quantity injected thereby. The actual opening interval of the valve is compared to the calculated desired opening interval of the valve to derive a difference value. The supply of fuel to the injection valve is determined by the position of a control sleeve controlled in turn by a command signal-responsive actuator. The difference value is used to adjust the command signal by an amount dependent on the sign and magnitude of the difference value in order to minimize the subsequent difference value.

20 Claims, 21 Drawing Figures

ELECTRONIC FUEL INJECTION CONTROL METHOD AND APPARATUS FOR A FUEL INJECTION TYPE INTERNAL COMBUSTION ENGINE

BACKGROUND OF THE INVENTION

The present invention relates to a fuel injection type internal combustion engine and more particularly to an electronic fuel injection control method and apparatus for a diesel engine.

U.S. Pat. No. 3,630,643 discloses a fuel injection pump which has a distribution piston which axially and rotationally moves to deliver fuel individually to the cylinders of a diesel engine. A collar slidably fits over the plunger and cooperates with the plunger to control the duration, and thus quantity, of fuel injection. The position of the collar is controlled by rotation of an armature which is determined by a controller, the signal indicative of the actual angle through which the armature has been rotated being fed back to the controller. However, since this feed back control is performed on the basis of sensed fuel pump conditions, and not actual fuel conditions it is not easy to make the actual fuel quantity injected exactly coincident with a desired fuel quantity because of changes in pressure of fuel within the pump and leakage of fuel via the collar, piston or the main portion of the pump housing.

SUMMARY OF THE INVENTION

According to the present invention, a desired fuel injection quantity is determined from engine operating parameters and then stored in a calculating unit. An actual fuel injection quantity is determined on the basis of sensor signals indicative of engine speed and the opening interval of the fuel injection valve. The measured opening interval of the valve is compared to the desired opening interval of the valve to effect control of the actual fuel injection quantity. Thus, the fuel injection quantity is controlled to an optimal value irrespective of the condition of oil seals of high fuel pressure sections of the system and errors in the manufacture of the pump.

BRIEF DESCRIPTION OF THE DRAWINGS

The features and advantages of the present invention will be apparent from the following description of a preferred embodiment of the present invention, taken in conjunction with the accompanying drawings in which.

DETAILED DESCRIPTION OF THE PREFERRED EMBODIMENT

Diesel Engine Control

Figure 1:
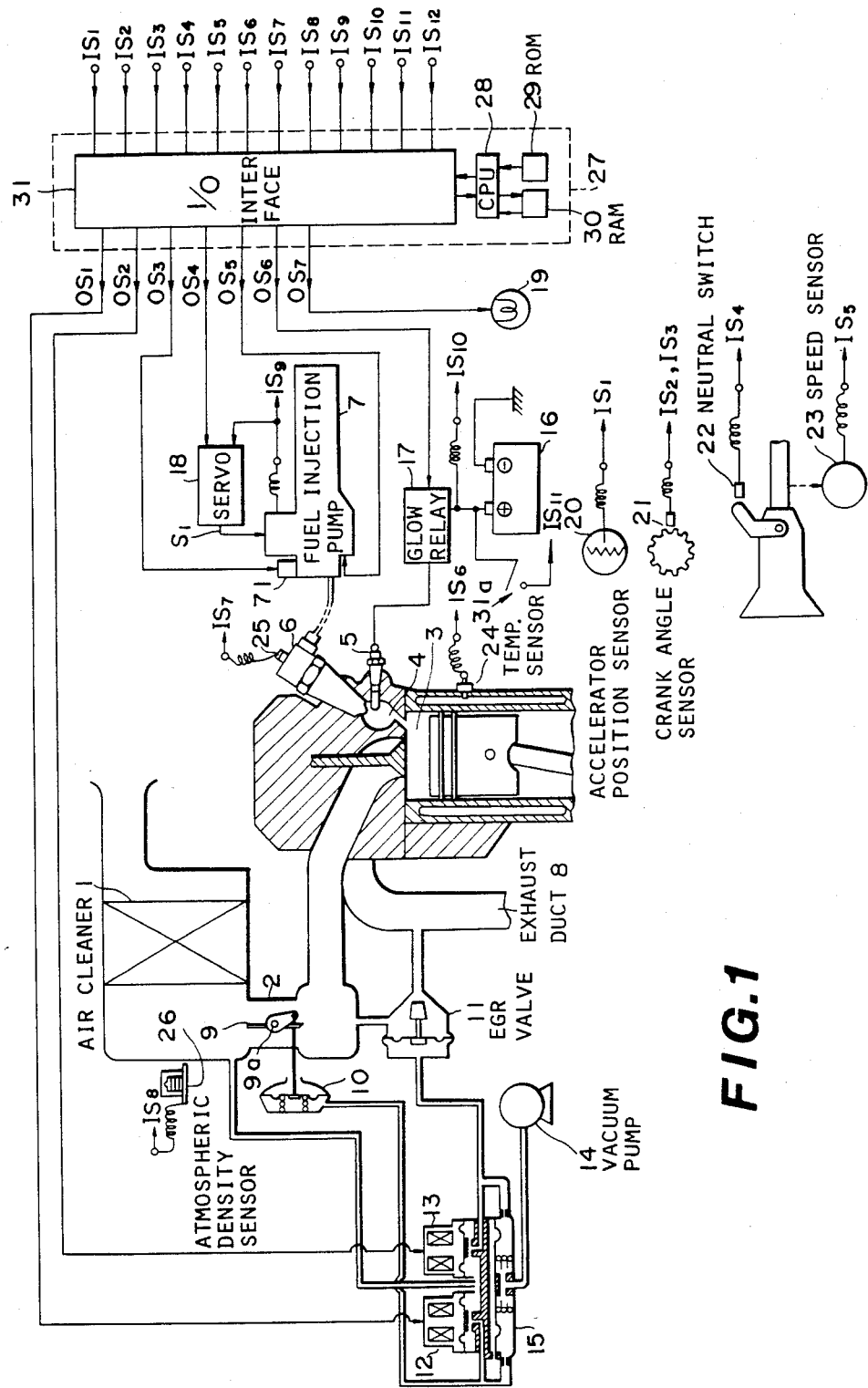
FIG. 1 is a diagram of an electric control system for a diesel engine in which the present invention is incorporated.

In FIG. 1 of the drawings, intake air is conducted via an air cleaner 1 in an air intake duct 2 to a main combustion chamber 3 of an engine. The swirl chamber 4 is provided with a glow plug 5 to preheat fuel injected from an injection nozzle or valve 6 into the chamber 4. A diaphragm valve 10 controls the opening of a throttle valve 9 controlling the amount of intake air to the engine. An EGR valve 11 controls the amount of EGR (exhaust gas recirculation) from an exhaust duct 8 to the air intake duct 2. A vacuum pump 14 or other vacuum pressure source is connected to a chamber 15 to maintain therein a reference vacuum pressure. Electromagnetic valves 12 and 13 control the connection of the reference pressure to the pressure-actuated diaphragm valve 10 and EGR valve 11, respectively, in order to adjust the actuation pressure derived from the air intake duct 2. A glow plug relay 17 controls the flow of electric current from a power supply 16 to the glow plug 5. A servo circuit 18 controls the output of fuel from a fuel injection pump 7 to the injection nozzle 6. An indicator lamp 19 indicates the state of supply of electric current to the glow plug 5. An accelerator position sensor 20 outputs a signal $IS_1$ indicative of the position (depression angle) of an accelerator, not shown. A crank angle sensor 21 produces a reference pulse $IS_2$ for each reference crank angle (for example 120°) rotation, and a unit pulse $IS_3$ for each unit crank angle (for example 1°) rotation. A neutral switch 22 outputs a signal $IS_4$ when it detects that the transmission is in the neutral position. A vehicle speed sensor 23 outputs a vehicle speed signal $IS_5$ indicative of the vehicle speed, the speed signal being determined by the rotational speed of the output shaft of the transmission. A temperature sensor 24 outputs a temperature signal $IS_6$ indicative of the temperature of cooling water for the engine. A lift sensor 25 outputs a signal $IS_7$ while the injection nozzle 6 is open to inject fuel, the lift sensor being for example a switch or piezoelectric element as will be described in greater detail later. An atmospheric density sensor 26 outputs a signal $IS_8$ indicative of the atmospheric density determined by the temperature and pressure of the atmosphere. A sleeve position signal $IS_9$ indicates the position of a sleeve, to be later described in more detail, which controls the amount of fuel injected from the injection pump 7. $IS_{10}$ denotes a signal indicative of the battery voltage.

A calculating system 27 comprises, for example, a microcomputer which includes a central processing unit (CPU) 28, a read only memory (ROM) 29, a read-/write memory (RAM) 30, and an input/output interface 31.

The calculating system 27 receives the above-mentioned signals $IS_1$ to $IS_{10}$, a starter signal $IS_{11}$ and a glow signal $IS_{12}$. The starter signal $IS_{11}$ is outputted from the manually operated key or starter switch 31a which is closed for operating the starter motor. The glow signal $IS_{12}$ is outputted from a glow switch, not shown, provided in the instrument panel and used to preheat the cylinders before start-up. The calculating system 27 outputs various control signals $OS_1$–$OS_7$ for controlling the diesel engine optimally.

The throttle valve-opening control signal $OS_1$ and the EGR control signal $OS_2$ are pulse signals whose duty cycles control the duty cycles of electromagnetic valves 12, 13 thereby controlling the opening of the throttle valve 9 and the EGR valve 11, respectively, in well-known manners.

The fuel shut-off control signal $OS_3$ controls the operation of a fuel shut-off valve 71 (for stopping the engine) provided in the injection pump 7.

The fuel injection quantity control signal $OS_4$ is supplied to the servo block 18 which outputs a servo signal $S_1$ for controlling the position of the sleeve, and thus, the fuel injection quantity. Solely when the engine speed is above a predetermined value $N_{rpm}$, the servo block 18 responds to $OS_4$ and the feedback signal $IS_9$ to correct the signal $IS_9$ to match control signal $OS_4$. The fuel injection quantity control signal $OS_4$ is determined on the basis of some of the input signals to the calculating system 27 including the injection duration signal $IS_7$, as will be explained later.

The injection timing control signal $OS_5$ controls an injection timing control mechanism provided in the injection pump 7 and therefore fuel injection timing. Injection timing is feedback controlled, using the rising edge of the injection duration signal $IS_7$ from the lift sensor 25.

The glow plug control signal $OS_6$ controls the glow plug relay 17 and therefore the supply of electric current to the glow plug 5.

The indicator lamp control signal $OS_7$ controls the turning on and off of the glow plug indicator 19 to thereby indicate whether or not the glow plug 5 is being operated. For example, when the glow plug is being operated, the indicator lamp 19 is lighted while when the glow plug is de-energized, the indicator lamp 19 is turned off.

Fuel Injection Pump

Figure 2:
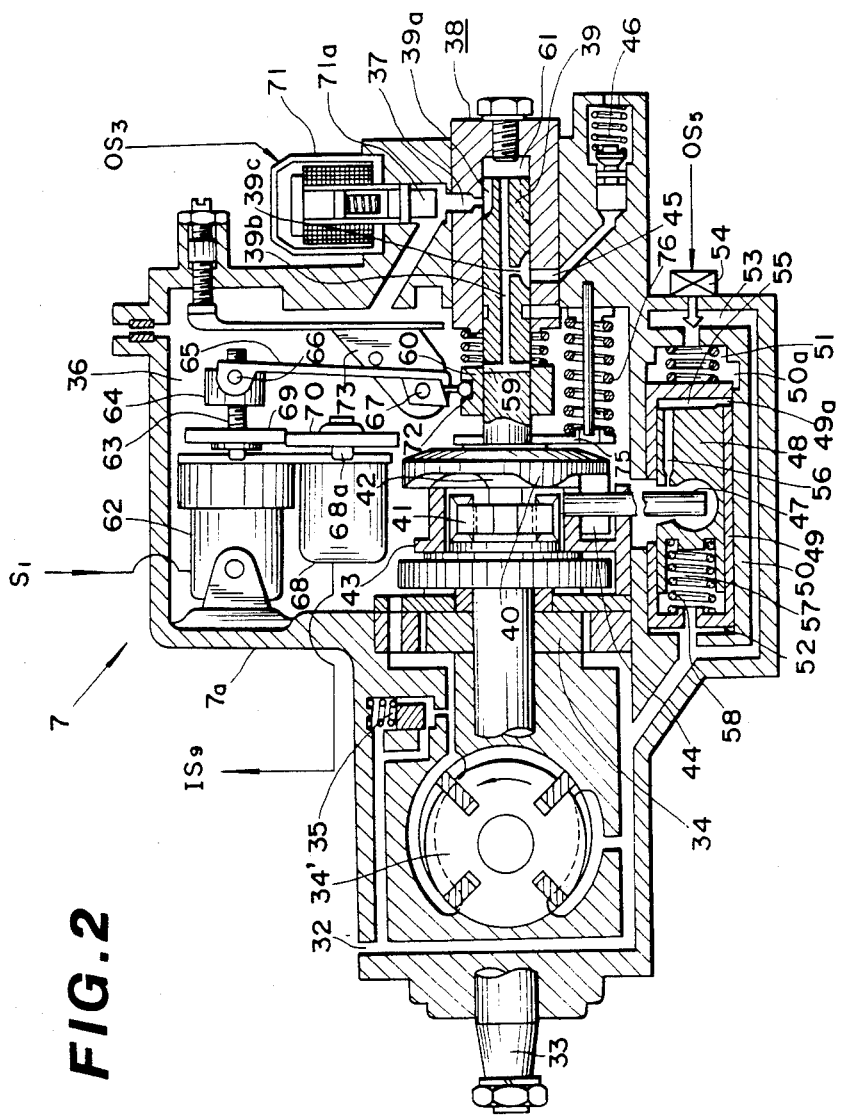
FIG. 2 is a diagrammatic view of a fuel injection pump used in the system of FIG. 1.

In the injection pump 7 shown in FIG. 2, fuel is drawn into the inlet 32 of the body of a feed pump 34 which is driven by the drive shaft 33 connected to the output shaft, not shown, of the engine. To facilitate understanding of the pump 34, it is shown at 34' as being rotated through 90 degrees. The pressure of the fuel discharged from the pump 34 is controlled by a pressure regulator valve 35 and is then supplied to a pump chamber 36 formed within the pump housing. The fuel enters a high-pressure plunger pump 38 through an inlet port 37. The fuel within the pump chamber 36 lubricates the operating parts of the pump arrangement.

The plunger 39 of the pump 38 is connected to a disc 40, which is loosely connected through keys 41 to the drive shaft 33 to be driven at a rotational rate proportional to the engine rotation. The disc 40 has the same number of cam faces 42 as the engine has cylinders, and translates axially, while being rotated, as the individual cam faces 42 pass over rollers 44 disposed along a roller ring 43 which is supported rotatably around the axis of the drive shaft 33, the rollers 44 each being supported pivotably by a respective one of radial shafts, not shown, secured angularly spaced to the roller ring 43, as shown in U.S. Pat. No. 4,177,775. The disc 40 and therefore the plunger are biased via a push plate 75 by a coil spring 76 against the rollers 44. Thus, when the drive shaft 33 is driven, the plunger 39 rotates while reciprocating. This reciprocal and rotating movement causes the fuel to be drawn into a chamber 61 through an intake port 37 and one of grooves 39a provided spaced circumferentially on the plunger 39 aligning with the inlet port 37 and to be forced under pressure through an axial groove 39b in the plunger from one of distributing ports 45 provided spaced circumferentially on the plunger 39 aligning with an outlet 39c in the plunger through the corresponding delivery valve 46 to the corresponding injection nozzle 6 of FIG. 1. Thus, the plunger 39 regulates the timing and rate of admission of fuel to the respective delivery valves 46 and therefore to the corresponding respective injection nozzles 6.

The timing of fuel injection is regulated by changing the relative position of the cam faces 42 and rollers 44 via rotation of the roller ring 43. This roller ring is connected to a plunger 48 through a drive pin 47. In FIG. 2, for the convenience of description, the plunger assembly is shown rotated through 90 degrees. A cylinder 49 in which the plunger 48 is accommodated is slidably received within a casing 50 and has a pair of hydraulic chambers 51 and 52 on the right-hand and left-hand ends of the cylinder 49. Passageway 49a and 50a are provided to bring the hydraulic chamber 51 and a high pressure end chamber 55 into communication when the cylinder 49 has moved to the right in the figure. The hydraulic chamber 51 communicates with the other hydraulic chamber 52 and the inlet side of the feed pump 34 through a fuel passageway 53. An electromagnetic valve 54 is provided in a passageway through which the hydraulic chamber 51 can communicate with the fuel passageway 53. The fuel pressure within the pump chamber 36 is conducted through a passageway 56 into the high-pressure end chamber 55 on the right-hand side of the plunger 48 slidable within the cylinder 49. In contrast, a low-pressure end chamber 57 on the opposite side of the plunger 48 communicates with the drawing-in side 32 of the feed pump 34 and is normally at a relatively low pressure. However, the plunger 48 is urged to the right by the force of a spring 58. The fuel pressure within the pump chamber 36 increases in proportion to the rotational speed of the feed pump 34 so that when the passageway 49a is closed, as shown, the plunger 48 is pushed to the left in the figure as the engine speed increases. This rotates the roller ring 43 in the direction opposite to the direction in which the eccentric disc 40 rotates so that the injection timing advances in accordance with the engine speed.

When the cylinder 49 moves to the right extreme in the figure due to the torque of the eccentric disc 40, and at the same time the electromagnetic valve 54 is open, the hydraulic chamber 51 and the high-pressure end chamber 55 communicate via the passageways 49a and 50a so that in this case the opening and closing of the electromagnetic valve 54 controls the pressure within the end chamber 55. Thus, the duty cycle of the valve 54, controlled by the injection timing control signal $OS_5$, controls the positioning of the roller ring 43 and thus the injection timing.

A fuel injection rate is determined by the position of a sleeve 60, slidable along the plunger 39, which is capable of covering a spill port 59 provided in the plunger 39. For example, if the opening of the spill port 59 goes beyond the right-hand end of the sleeve 60 due to the movement of the plunger 39 to the right in the figure, the fuel, which has been forced under pressure from the plunger pump chamber 61 through the axial passageway 39b and outlet 39c to the distributing port 45 aligning with the outlet 39c, will be vented into the pump chamber 36 through the spill port 59, thereby circumventing the supply of fuel under pressure.

Specifically, if the sleeve 60 is displaced to the right relative to the plunger 39, the timing of cessation of fuel injection will be retarded so that the fuel injection rate will increase, whereas if the sleeve 60 is displaced to the left relative to the plunger 39, the timing of cessation of fuel injection will be advanced so that the fuel injection rate will decrease.

Of course, the movement of the ignition switch to the position where the starter motor is operated causes the sleeve 60 to move to the start-up injection position. The subsequent positions of the sleeve and therefore the servomotor are based on values read out from a memory table in the ROM 29 in FIG. 1 according to the instantaneous engine speeds and loads, and adjusted according to the accuracy of response of a servomotor 62, as will be explained later.

The control of the sleeve 60 position is carried out by a servomotor 62, supported on the pump housing 7a, which has an outside threaded shaft 63 which is screwed into an inside threaded hole provided at the center of a slider 64, which thereby moves axially in response to rotation of the shaft 63.

Connected pivotally at a pin 66 to the slider 64 is a link lever 65 which is also supported at a pivot 67 of a support 73 and engaged with the sleeve 60 via a pivot pin 72 provided at the end of the link lever 65.

Thus, when the servomotor 62 rotates in one direction or other, the slider 64 moves to the right or left in the figure so that the link lever 65 turns around the pivot 67 in one direction or the other, thereby moving the sleeve 60 to the left or right. The control of the servomotor 62 is effected by the servo signal $S_1$ outputted from the servo circuit 18 according to the fuel injection control signal $OS_4$.

Thus, there is no direct correspondence relationship between the depression of the accelerator pedal and the fuel injection rate. That is, the accelerator pedal only acts to transmit the driver's desire to "acceleration" or "deceleration" to the calculating device 27 which calculates an optimal fuel injection rate according to the operating state of the engine at that time and effects a corresponding optimal control according to the fuel injection rate control signal $OS_4$, as will be explained in greater detail later.

A potentiometer 68 is provided in the vicinity of the servomotor 62 and has a shaft 68a which is connected to the shaft 63 of the servomotor 62 through gears 69 and 70 secured to the shafts 63 and 68a, respectively, so that when the servomotor 62 is operated, the gears 69 and 70 are rotated, whereby the potentiometer 68 produces a sleeve position signal $IS_9$ which indicates the position of the sleeve 60.

An electromagnetic fuel shut-off valve 71 is controlled by the fuel shut off control signal $OS_3$ mentioned hereinbefore with respect to its opening and closing. When the signal $OS_3$ indicates a shut-off command, the intake port 37 is closed by a valve member 71a to shut off the supply of fuel, thereby stopping the engine.

Fuel Injection Control

Figure 3:
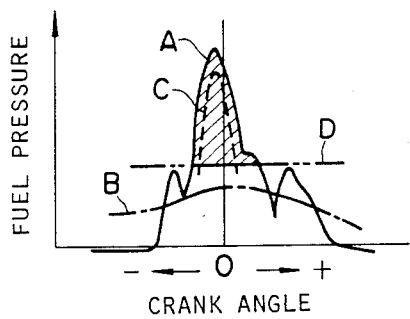
FIG. 3 is a graph of a characteristic pressure/crank angle curve related to fuel injection quantity.

In FIG. 3 are shown the relationship A of crank angle to fuel pressure in the fuel passageway leading to the fuel injection valve, pressure B in the combustion chamber, injection pressure or differential pressure C between A and B, and pressure D set by the valve spring. Thus, while the pressure A exceeds D, as shown by the hatching, the fuel injector valve is opened and fuel injection occurs.

Figure 4A:
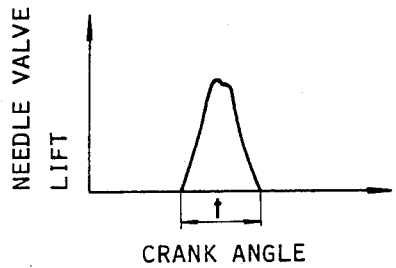
FIGS. 4(a) through (d) are graphs relating needle valve lift to other fuel-injection-related parameters.
Figure 4B:
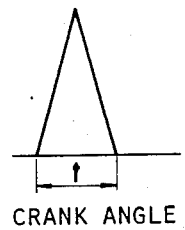
Figure 4C:
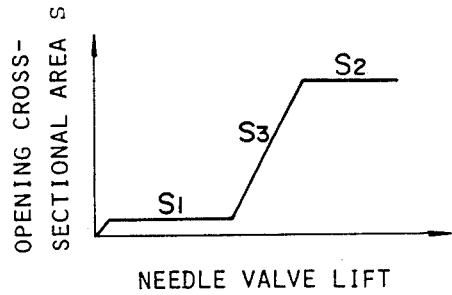
Figure 4D:
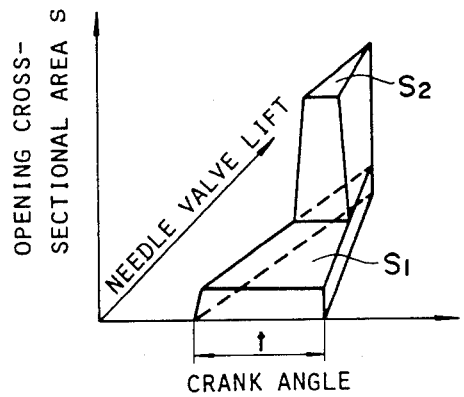

FIG. 4A shows the relationship between needle valve lift and crank angle, slightly changing in accordance with fuel injection quantity, which canbe approximated by a triangular curve shown in FIG. 4B. FIG. 4C is a graph of the relationship of lift and opening area of a needle valve having a throttle nozzle. The throttle nozzle includes a smaller bore of area $S_1$, a larger bore of area $S_2$ and an intermediate tapered bore of area $S_3$ connecting $S_1$ and $S_2$. The combination of the FIGS. 4B and 4C produces the three-dimensional graph of FIG. 4D. If fuel injection quantity, injection time, average opening area of the injection valve, and average injection pressure during a single injection cycle are designated Q, t, S and P, respectively, the fuel injection quantity can generally be given by:

$$Q = S \times \sqrt{P} \times t$$

Since the average opening area S can be regarded as a function of injection duration t, and the average injection pressure P is a function of engine speed n and fuel injection quantity Q, Q can be given by:

$$Q \propto f(t) \times \sqrt{f(n,Q)} \times t$$

Figure 5:
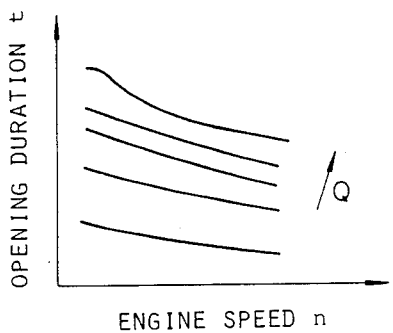
FIG. 5 shows the relationship between fuel injection quantity versus engine speed and opening interval of the injection valve.

Thus, since Q is roughly expressed in terms of n and t, if the relationship among Q, n and t is clarified and illustrated graphically in advance, as shown in FIG. 5, Q can be obtained from n and t. Since the engine speed can be sensed with high accuracy by conventional means, the technique of sensing the engine speed will not described, but methods of sensing the injection duration t will be described in detail.

Figure 7:
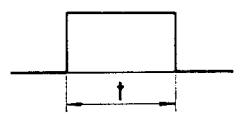
Figure 6:
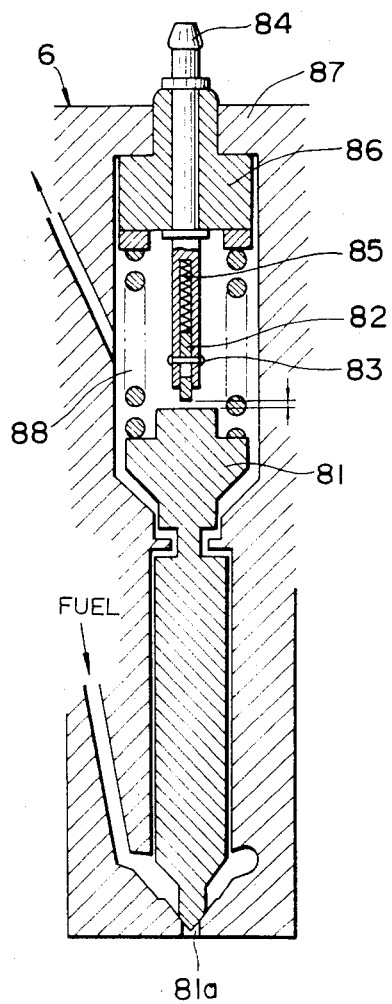
FIGS. 6, 8, and 10 are cross-sectional views of needle valve lift sensors, the sensors of FIGS. 8 and 10 being shown in fragmentary views.

Toward this end, a contact type needle valve lift sensor, as shown in FIG. 6, is provided in the injection valve 6 in which a contact 82 opposite the upper end of a needle valve 81 is mounted slidably in a terminal 84 on a pin 83. The contact 82 normally protrudes toward the needle valve 81 due to a biasing spring 85. Thus, when the needle valve 81 is lifted open, the needle valve 81 comes into contact with the contact 82 so that the contact 82 is grounded through the needle valve 81 to produce a square-wave pulse, as shown in FIG. 7. An insulator 86 secures the terminal 84 to the injector housing 87. A return spring 88 normally biases the needle valve 81 downward to block the nozzle port 81a. The other structural portions of the valve not referred to are well known so that further description will not be given.

Figure 9:
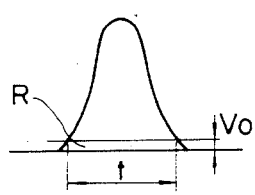
FIGS. 7 and 9 illustrate the output signals from the lift sensors.
Figure 8:
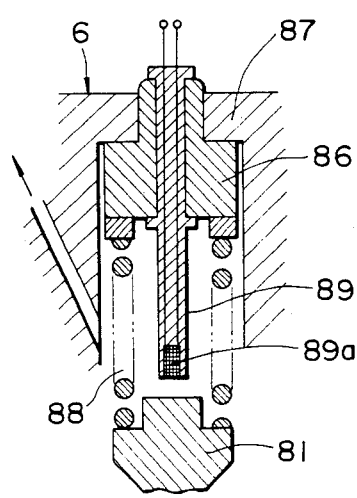

FIG. 8 shows an induction-type needle valve lift sensor where the movement of the needle valve 81 is sensed as a change in the resistance of an induction coil 89a provided at one end of a central rod 89. The output signal of the sensor is then amplified and shaped to produce a lift curve, as shown in FIG. 9. This lift curve is truncated at a reference voltage $V_o$ to obtain a flat-top signal R, similar to that shown in FIG. 7.

Figure 10:
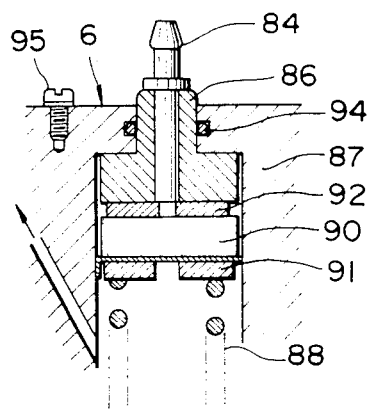

FIG. 10 shows a piezoelectric needle valve lift sensor wherein changes in the load on the return spring 88 accompanying the movement of a needle valve 81 are sensed by a piezoelectric element 90 to produce an electrical signal such as shown in FIG. 9. In this case, in the same way, a nearly rectangular waveform truncated at a reference voltage $V_o$ should be obtained. In FIG. 10, reference numeral 91 denotes a grounded shim, reference numeral 92 an electrode disc, reference numeral 94 an oil seal and reference numeral 95 a grounded terminal.

Figure 11:
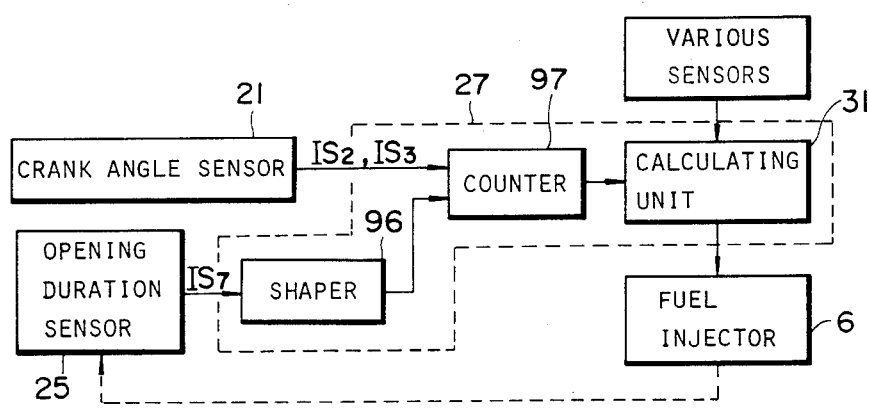
FIG. 11 is a block diagram of a signal processing device according to the present invention.
Figure 12:
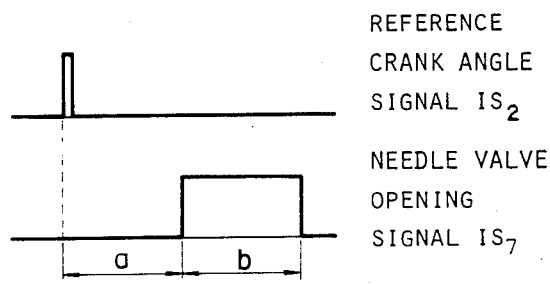
FIG. 12 illustrates signals inputted to a counter of the processing device of FIG. 11.

FIG. 11 is a signal flowchart of the method of the present invention employing one of the nozzles in FIGS. 6, 8, and 10. The needle valve lift signal outputted from the lift sensor 25 is inputted via a wave shaper 96 to a counter 97. This counter also receives the output of the crank angle sensor 21. These input signals determine the duration for which the valve is opened and a signal indicative of the determined duration is inputted to the calculating unit 31. In more detail, as shown in FIG. 12, the crank reference signal $IS_2$ and the needle valve opening signal $IS_7$ are inputted to the counter 97, the interval a between the rising edges of these signals is inputted to the calculating unit 31 as an injection timing signal and the duration b of the needle valve opening signal $IS_7$ as the injection duration signal $IS_7$. These intervals a and b are counted by unit pulses $IS_3$ supplied from the crank angle sensor 21 to the counter 97.

Figure 13:
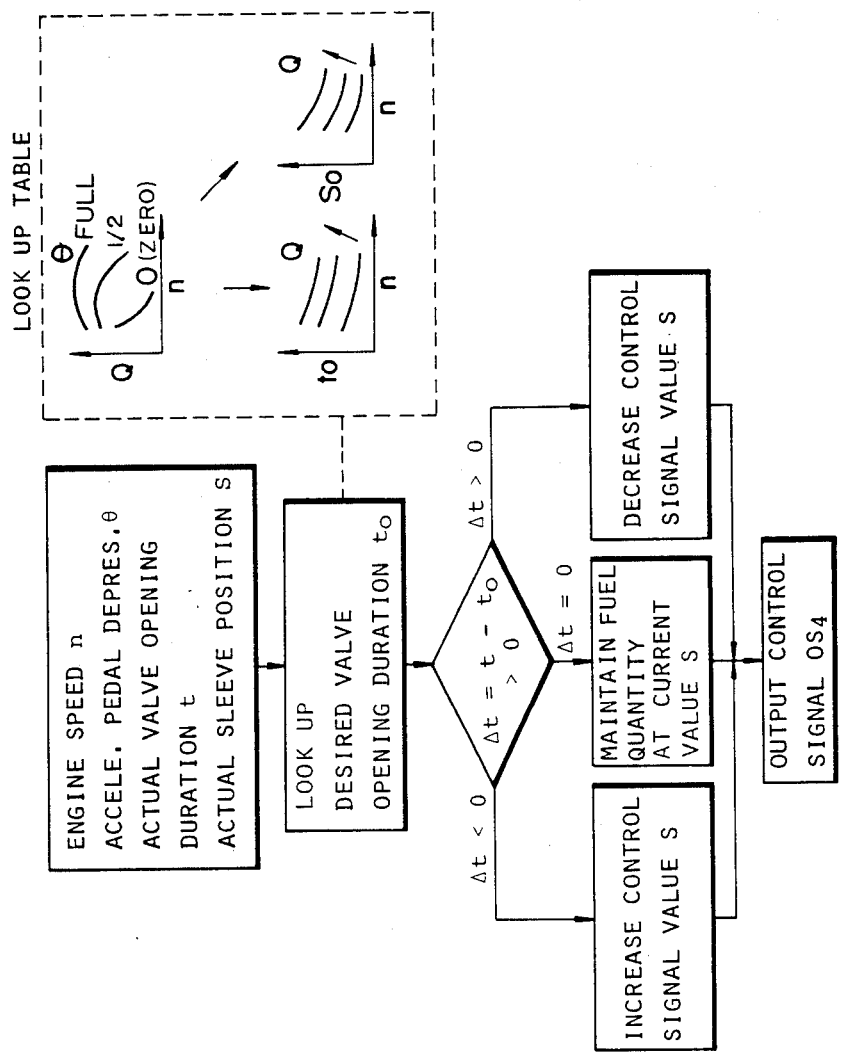
FIG. 13 is a flowchart of signals according to the present invention.
Figure 14:
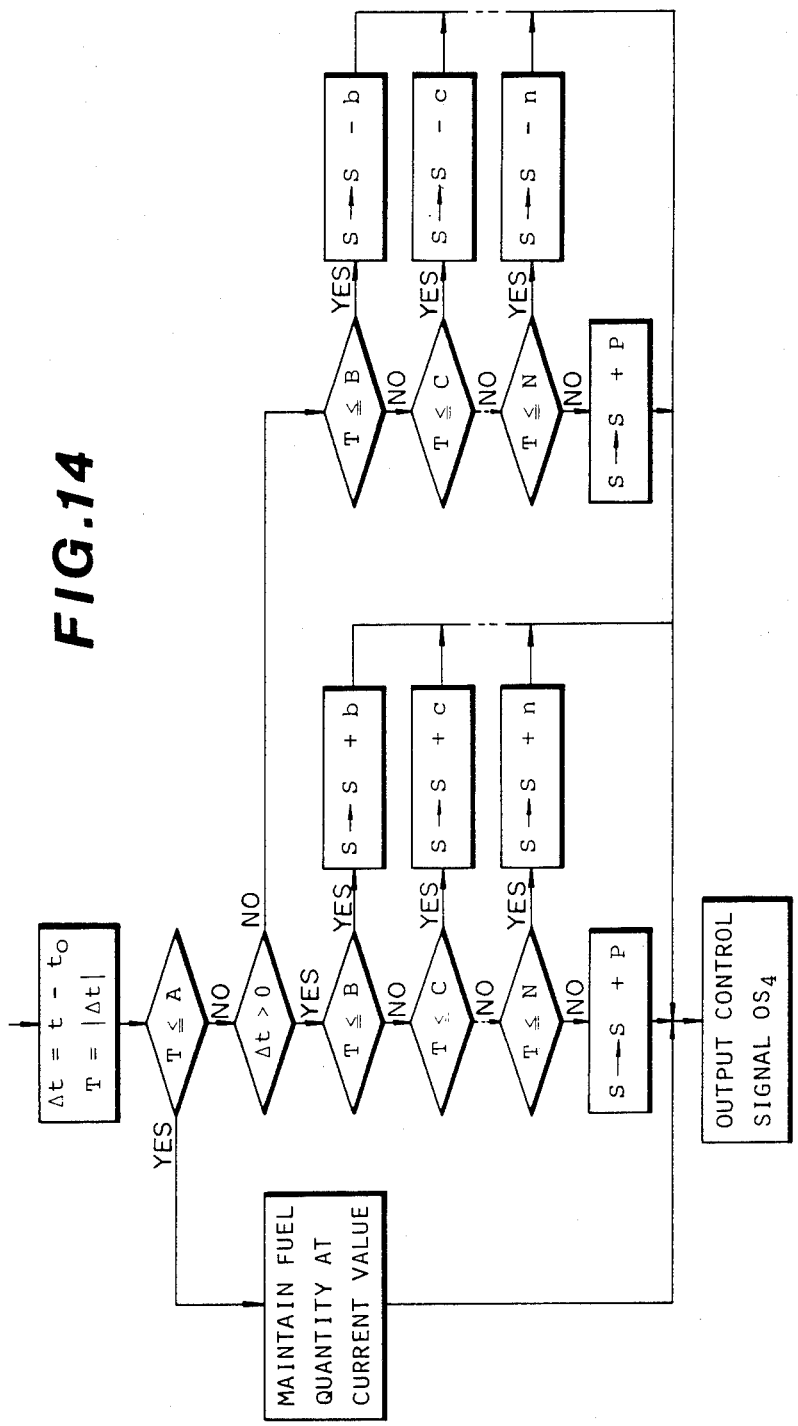
FIG. 14 is a flowchart showing the procedure of calculating the commands mentioned in FIG. 13.

FIG. 13 shows the flow of commands within the calculating unit 31. The driver's intention is inputted as a signal $IS_1$ indicative of an accelerator depression angle $\theta$, into the calculating unit 31. In addition, signals $IS_3$, $IS_7$, and $IS_9$, indicative of actual engine speed n, actual valve opening duration t, and sleeve position S respectively, are inputted to the calculating unit 31. The engine speed n and the accelerator depression angle $\theta$ are used to calculate the desired injection valve opening duration value $t_o$ and the desired sleeve position value $S_o$. This value $t_o$ is compared to the actual opening duration value t of the injection valve and the difference $\Delta t$ between $t_o$ and t orders an increase or decrease in, or maintenance of, sleeve position value S to generate control signal $OS_4$ to the sleeve actuator servomotor 62. At this time, the accuracy of engine response to operation of the accelerator pedal is improved by adjustment of fuel injection quantity in accordance with the magnitude of the absolute value of $\Delta t$. That is, in FIG. 14, the absolute value of the difference $\Delta t$ is compared to each of a plurality of constants A, B, C, . . . obtained experimentally, and in accordance with the results of these comparisons, the control signal $OS_4$ of the position of the sleeve S is changed by a, b, c, . . . , thereby improving the accuracy of engine response to accelerator pedal position. Increases and decreases in fuel injection quantity are not necessarily the same. When the values of A, B, C . . . are equally spaced, the values of a, b, c . . . can be irregularly spaced. Conversely, when the values of A, B, C, . . . are unequally spaced, the values of a, b, c . . . might be equally spaced.

FIG. 13 indicates that the $t_o$ value for one injection cycle is compared to the t value from the previous cycle. In practice, the rate of change of $t_o$ will be so small as to provide no appreciable inaccuracy, but it will be clear to those skilled in the art how to store the $t_o$ value from cycle to cycle to ensure absolute accuracy.

Control of injection timing and EGR is effected on the basis of engine speed and fuel injection quantity. In this case, it is determined depending on the response of the actuator servomotor 62 for driving the control sleeve which of the desired value $t_o$ and the actual value t should be employed as the value of fuel injection quantity in injection timing and EGR calculations. For example, when an actuator with good response, i.e. low $\Delta t$ value, is used, the actual value t should be employed, whereas when an actuator with bad response is to be used, the desired value $t_o$ should be employed, in order to ensure accurate control of injection time and EGR.

Figure 15:
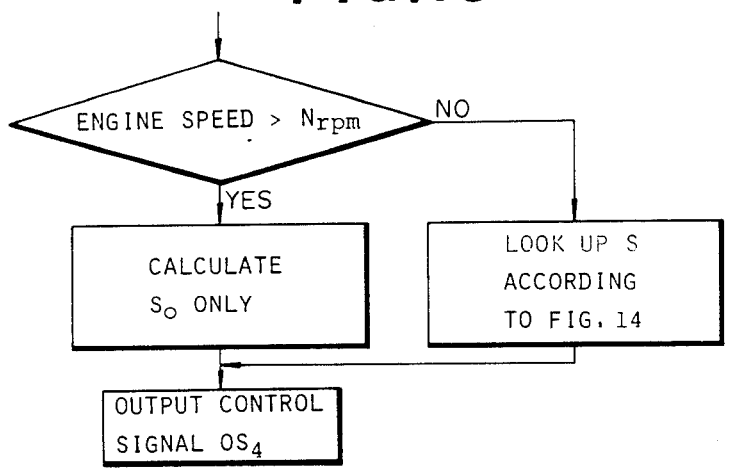
FIG. 15 is a flowchart of control system selection.

The injection or valve opening duration t decreases as the engine speed n increases although the crank angle value corresponding to the injection duration is constant. Thus, when clock pulses are used in the counter 97 to count the valve opening duration t, the accuracy of the duration t count deteriorates. Thus, as shown in FIG. 15, feedback control of the valve opening duration t is carried out by looking up an appropriate S according to FIG. 14 solely below a predetermined engine speed $N_{rpm}$ whereas either open or feedback control of the sleeve position S is carried out above the predetermined engine speed. Open control of the sleeve position is accomplished by calculating $S_o$ above the predetermined engine speed, while feedback control of the sleeve position is carried out using the feedback signal $IS_9$ shown in FIG. 1 above the predetermined engine speed to improve the accuracy of control of fuel injection quantity. A device in which the actual value obtained in the manner described above is displayed in an analog or digital mode would constitute a high-accuracy fuel injection quantity measuring device.

Figure 16:
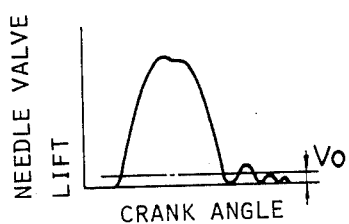
FIG. 16 shows a curve representing the actual lift profile of the needle valve.
Figure 17:
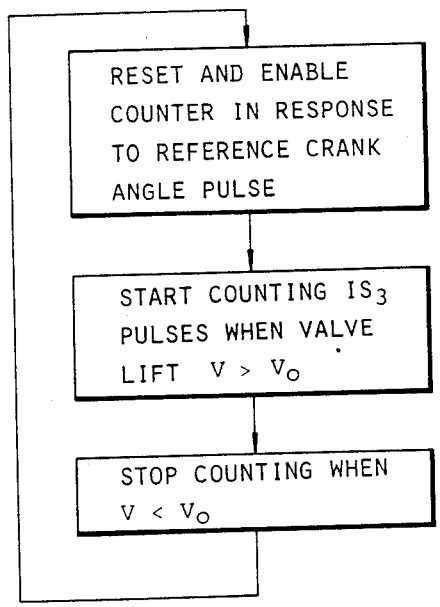
FIG. 17 shows the logical flow of the signal processor incorporated in the counter.

The lift of needle valve 81 in fact includes some hunting as shown in FIG. 16. Thus, if the output of the lift sensor 25 is truncated at the reference value $V_o$, some succeeding hunting vibrations will be counted. However, these succeeding hunting vibrations are very short, and not desirable for the quantitative treatment of lift signal, as mentioned above. Thus a logic circuit operating as shown in FIG. 17 may be incorporated in the counter 97 to eliminate pulses due to hunting following the first jump of the needle valve 61.

Figure 18:
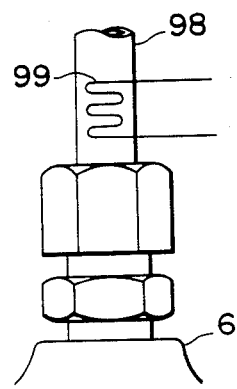
FIG. 18 is a front view of a sensor (pressure pickup) for opening interval of the injection valve as an alternative to the lift sensor.

The opening duration t of the valve 90 need not be necessarily measured solely by the lift of the needle valve. It can be measured by determining the strain in a fuel line 98 leading between the fuel injection pump 7 and the injection valve 6, by means of a strain gauge 99, as shown in FIG. 18, and transforming the output of the gauge 99 to approximate the output of the lift sensor 25. Alternatively, the internal pressure of the fuel line 98 can be measured for the same purpose. When the opening duration of the needle valve is to be measured by means of the internal pressure in the fuel line 98, it goes without saying that the output of the pressure pickup should be truncated at the opening pressure of the needle valve.

In the preferred embodiment, the desired opening duration of the injection valve has been compared to the actual measured opening duration, but opening duration is only one of several factors indicative of the fuel injection quantity. Alternatively, the measured actual fuel injection quantity obtained on the basis of actual engine speed and actual opening duration of the injection valve may be compared to the desired fuel injection quantity to effect a feedback control by which the difference between the actual fuel injection quantity and the desired fuel injection quantity is reduced, thereby achieving the optimal fuel injection quantity.

In the above embodiment, accelerator depression is used as one of operating parameters indicative of required engine power output. However, other operating parameters may be used in the calculation of the desired fuel injection quantity.

As described above, according to the present invention, a desired fuel injection quantity or related elements derived from predetermined relationship with other engine operating parameters are compared to the actual fuel injection quantity obtained on the basis of engine speed and the opening duration of the injection nozzle or related values so as to eliminate the difference therebetween in a feedback control manner. Thus, manufacturing errors in and/or and aging of the injection pump are compensated for so that the fuel injection quantity and injection timing and EGR can be accurately controlled.

While the present invention has been described in terms of a preferred embodiment thereof, the present invention is not limited to it. Various changes and modifications could be made by those skilled in the art without departing from the spirit and scope of the present invention as set forth in the attached claims.

What is claimed is:

1. A fuel injection quantity control method for an internal combustion engine with a fuel injection valve, and an actuator controlling the quantity of fuel supplied to the fuel injection valve in response to a control signal comprising the steps of:
   (a) sensing a plurality of engine operating parameters including engine speed;
   (b) calculating a desired fuel injection valve opening interval on the basis of the sensed engine operating parameters;
   (c) sensing an opening interval of said fuel injection valve;
   (d) comparing the desired and actual opening intervals of the valve to derive a difference; and
   (e) adjusting the control signal to the actuator in accordance with the difference,
   whereby the actuator is controlled so as to adjust the quantity of injected fuel, corresponding on the basis of the sensed engine parameters to the injection valve opening interval, to more nearly equal a desired fuel injection quantity corresponding to the desired fuel injection valve opening interval.

2. A fuel injection quantity control method for an internal combustion engine with a fuel injection valve, and an actuator controlling the quantity of fuel supplied to the fuel injection valve in response to a control signal, comprising the steps of:
   (a) sensing a plurality of engine operating parameters including engine speed;
   (b) calculating a desired fuel injection valve opening interval corresponding to a desired fuel injection quantity on the basis of the sensed engine operating parameters;
   (c) sensing an actual opening interval of said fuel injection valve;
   (d) comparing the desired and actual opening intervals of the valve to derive a difference;
   (e) comparing the difference between the actual and desired opening intervals of the valve to a plurality of quantitative ranges to determine which of the ranges includes the difference; and
   (f) adding to the control signal a predetermined control signal adjustment value associated with the range within which the difference falls.

3. The method of claim 1 or 2, wherein in step (c), the interval during which the pressure in a fuel line leading to the fuel injection valve exceeds that required to open the fuel injection valve is sensed in order to derive the opening interval of the fuel injection valve whereby the actual injected fuel quantity is determinable.

4. The method of claim 2, wherein said step (c) is effected when the sensed engine speed is below a predetermined value.

5. The method of claim 2, wherein the sensed engine parameters include an accelerator pedal depression angle in addition to engine speed.

6. The method of claim 2, wherein said step (c) includes the step of sensing the time interval during which a needle of said valve jumps beyond a predetermined value due to the pressure of fuel and eliminating hunting following the first jump of said needle.

7. The method of claim 2, wherein the step (c) includes the step of counting pulses, each of which is produced each time an engine crank is rotated over a unit degree, to determine the opening interval.

8. The method of claim 2, wherein the steps (c), (d), (e) and (f) are effected below a predetermined engine speed.

9. The method of claim 8, further including the step of carrying out an open control of the position of a control sleeve of said actuator which controls supplying fuel to said valve above the predetermined engine speed.

10. The method of claim 8, further including the step of carrying out a feedback control of the position of a control sleeve of said actuator which controls supplying fuel to said valve above the predetermined engine speed.

11. A fuel injection quantity control apparatus for an internal combustion engine with a fuel injection valve and a device determining the quantity of fuel supplied to the fuel injection valve, comprising:
   (a) an actuator responsive to a control signal for controlling an operating condition of the fuel quantity-determining device;
   (b) a first sensor for producing a first sensor signal indicative of the opening interval of the fuel injection valve;
   (c) a plurality of other sensors for producing auxiliary sensor signals including engine speed, said signals indicative of other engine operating conditions;
   (d) controlling means receiving the sensor signals and having a calculating means for calculating the desired fuel injection valve opening interval on the basis of the auxiliary sensor signals, comparing the desired and actual opening intervals of the valve to derive a difference quantity, and producing the control signal to the actuator in accordance with the difference quantity,
   whereby the actual of injected fuel, corresponding to the injection valve opening interval, is caused to more nearly equal a desired quantity of injected fuel, corresponding on the basis of the auxiliary sensor signals to the desired fuel injection valve opening interval.

12. The apparatus of claim 11, wherein said first sensor comprises:
   (a) an electrically-conductive pin disposed near the needle valve of a fuel injection valve and engageable therewith to be electrically grounded when the needle valve is moved in order to inject fuel;

(b) means for supporting said pin so as to be movable with the needle valve; and (c) an output terminal electrically connected to said pin and electrically insulated from ground.

13. The apparatus of claim 11, wherein said first sensor comprises a piezoelectric transducer, an electrically-grounded surface of which indirectly receives the pressure exerted on the fuel injection valve, and the opposite surface of which is electrically connected to an output terminal.

14. The apparatus of claim 11, wherein said first sensor comprises a strain gauge disposed with a fuel supply line leading to the fuel injection valve.

15. The apparatus of claim 11, wherein said controller means is operable before producing the control signal on the basis of the difference for comparing the difference between the actual and desired opening intervals of the valve to a plurality of quantitative ranges to determine which of the ranges includes the difference and for adding to the control signal a predetermined control signal adjustment value associated with the range within which the difference falls.

16. A fuel injection quantity control apparatus for an internal combustion engine with a fuel injection valve and a device determining the quantity of fuel supplied to the fuel injection valve, comprising:

(a) an actuator responsive to a control signal for controlling the operating condition of the fuel quantity-determining device;

(b) a first sensor for producing a first sensor signal indicative of the opening interval of the fuel injection valve;

(c) a plurality of other sensors for producing auxiliary sensor signals including engine speed, said signals indicative of other engine operating conditions;

(d) a controller receiving the sensor signals and having a calculating unit for calculating the desired fuel injection valve opening interval corresponding to a desired fuel injection quantity on the basis of the auxiliary sensor signals, comparing the desired and actual opening intervals of the valve to derive a difference quantity, comparing the difference between the actual and desired opening intervals of the valve to a plurality of quantitative ranges to determine which of the ranges includes the difference, and adding to the control signal a predetermined control signal adjustment value associated with the range within which the difference falls.

17. The apparatus of claim 16, wherein said first sensor comprises an electrical inductor disposed near the electrically-conductive needle valve of a fuel injection valve so that as the needle valve moves to inject fuel, the resistance across the inductor varies.

18. The apparatus of claim 16, wherein the auxiliary sensor signals further include an accelerator pedal depression angle.

19. The apparatus of claim 16, wherein said first sensor senses the time interval during which a needle of said valve jumps beyond a predetermined value due to the pressure of fuel, and further including means responsive to the end of the time interval for eliminating hunting following the first jump of said needle.

20. The apparatus of claim 16, further including means for producing pulses, each of which is produced each time an engine crank is rotated over a unit degree and means for counting the pulses to determine the opening interval.

* * * * *